July 22, 1930.  F. W. GAY  1,771,252

ELECTRIC POWER GENERATING SYSTEM

Filed Aug. 31, 1928

INVENTOR.
FRAZER W. GAY
BY
George D. Richards
ATTORNEY.

Patented July 22, 1930

1,771,252

UNITED STATES PATENT OFFICE

FRAZER W. GAY, OF NEWARK, NEW JERSEY

ELECTRIC POWER-GENERATING SYSTEM

Application filed August 31, 1928. Serial No. 303,145.

This invention relates, generally, to electric power generating systems and the invention has reference, more particularly to an electric power generating system wherein a single source of power generation is adapted to supply two electrical circuits with electrical energy such that, though the voltage on one of said circuits may vary within wide limits, the voltage on the other of said circuits shall remain substantially constant under all operating conditions.

In modern central power stations the size of the individual generating units is so great that each unit is coming to be considered practically as a separate and independent power station. Each generator has its own turbines, boilers, auxiliary power supply and etc., separate from every other such unit. It is therefore required that such a generator provide its auxiliary apparatus with a source of power having a substantially constant voltage under all operating conditions, from no load on the generator circuits to short circuit thereof. Heretofore it has been customary to supply such auxiliary apparatus with power from a small generator direct coupled to the main generator shaft or from a small auxiliary generator driven by a small separate turbine.

It is the object of this invention to provide a novel generating system wherein the main generator itself is adapted to supply not only the main load circuit but is also adapted to supply the auxiliary load circuit, said auxiliary load circuit operating on a substantially constant voltage at all times and being substantially independent of voltage fluctuations in said main load circuit. More particularly this invention has for its object to provide a generator having auxiliary windings which are normally adapted to supply electrical energy at a voltage in excess of the voltage impressed on said auxiliary circuit. Transition means are provided for converting a portion of this energy to the main load circuit under normal operating conditions and the remainder at a lower potential is used to supply the auxiliary load circuit. In the event of a short circuit in the main load circuit, causing a drop in the voltage generated in the generator windings, the transition means is adapted to pass the energy from the auxiliary windings onto the auxiliary load circuit with but little drop in voltage so that the voltage of the auxiliary circuit remains substantially constant at all times.

Other objects of this invention, not at this time more particularly enumerated, will be clearly understood from the following detailed description of the same.

With the various objects of the invention in view, the same consists, primarily, in the novel construction and arrangement of generating system hereinafter set forth; and, the invention consists, furthermore, in the novel arrangements and combinations of the various devices and parts, as well as in the details of the construction of the same, all of which will be hereinafter more fully described and then finally embodied in the claims appended hereto.

The invention is clearly illustrated in the accompanying drawings, in which:—

Similar characters of reference are employed in all of the hereinabove described views, to indicate corresponding parts.

Figure 1:
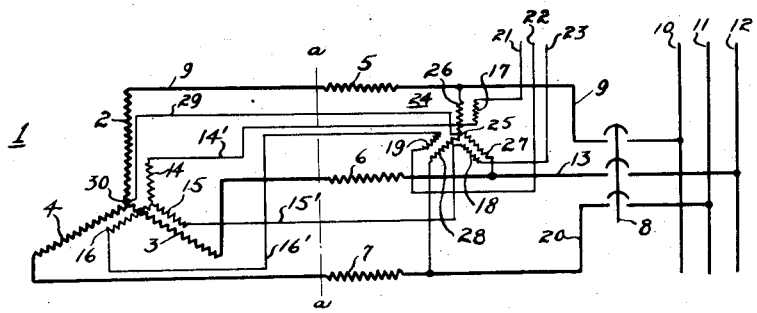
Figure 1 is a diagrammatic representation of the novel power generating system of this invention.

Referring now to the said drawings, the reference character 1 designates a three phase generator having main windings 2, 3 and 4 that are connected by leads 9, 13 and 20 through suitable reactances 5, 6 and 7 respectively, and through a circuit breaker 8 to a three phase main power bus 10, 11 and 12. The generator 1 has auxiliary power windings 14, 15 and 16, each of which windings are preferably positioned centrally with respect to one of the main windings 2, 3 and 4.

Thus, assuming the generator 1 to be wound with seven coils per pole per phase, the mid coil of each phase may be used as one of the windings 14, 15 and 16 while the remaining six coils of each phase would constitute one of the main windings 2, 3 and 4. As thus connected, the time phase of the generated E. M. F. of any one of the windings 14, 15 and 16 is the same as the average time phase of the corresponding adjacent winding 2, 3 or 4. The windings 14, 15 and 16 are connected by leads 14', 15' and 16' to one of the secondaries 17, 18 and 19 respectively of a bucking transformer bank 24. The other end of the secondaries 17, 18 and 19 are connected in turn to the leads 21, 22 and 23 of an auxiliary power circuit. This auxiliary power circuit is adapted to supply electrical energy to the auxiliaries such as pumps, blowers, etc. of the generator 1. The primaries 26, 27 and 28 of the transformer bank 24 are each connected at one of their ends to the leads 9, 13 and 20 respectively while the other ends of these primaries are connected together forming the neutral 25. Neutral 25 may be connected as by a lead 29 to the neutral 30 of the main generator windings 2, 3 and 4.

In operation, the main windings 2, 3 and 4 of the generator 1 are adapted to supply electrical energy at the desired potential to the power bus 10, 11 and 12. The auxiliary windings 14, 15 and 16 are designed to produce electrical energy at a higher potential than that desired to be impressed upon the auxiliary power circuit 21, 22 and 23. The transformer bank 24 is used to lower the potential of the current delivered by the auxiliary windings so as to adapt the output of these windings for supplying the auxiliary power circuit. The current from the auxiliary windings 14, 15 and 16 suffers a drop in potential in passing through the secondaries 17, 18 and 19 of the bucking transformer. The energy represented by this drop in potential is absorbed by the primaries 26, 27 and 28 of the transformer bank 24 and is passed on to the main load circuit connected to the power bus 10, 11 and 12. Thus, during normal operation of the generator 1, a certain proportion of the energy supplied by the auxiliary windings is passed on to the main load circuit while the remainder is used to supply the generator auxiliaries on the line 21, 22 and 23. The voltage of the line 21, 22 and 23 may be considerably lower than that existing at the terminals of the windings 14, 15 and 16 owing to the drop produced in the transformer bank 24.

In the event that a short circuit occurs on the main power bus 10, 11 and 12, the potential of this bus is reduced substantially to zero value and the E. M. F. at the terminals of the main windings is also reduced to a value depending upon the characteristics of the generator 1 and that of the reactors 5, 6 and 7. The E. M. F. at the terminals of the auxiliary windings is proportionally reduced. During such period of short circuit there is no voltage on the transformer primaries 26, 27 and 28 and hence there is very little loss of voltage in the secondaries 17, 18 and 19, so that the voltage impressed upon the auxiliary circuit 21, 22 and 23 is substantially that existing at the terminals of the auxiliary windings. By suitably proportioning the windings of the generator 1 and the reactors 5, 6 and 7 the E. M. F. at the terminals of the auxiliary windings 14, 15 and 16 may be made to assume any desired value within reasonable limits during periods of short circuit of the bus 10, 11 and 12. By proportioning these parts so that under short circuit conditions the voltage at the terminals of the auxiliary windings is greater than the operating voltage of the auxiliary circuit by an amount equal to the impedance drop in the transformer 24, then the auxiliary windings will maintain the desired operating voltage upon such auxiliary circuit even during periods of short circuit of the main bus. Thus, the auxiliaries of the generator 1 have a substantially constant source of power supply under all conditions from no load on the generator circuit to short circuit thereof.

In a typical installation of this character, the auxiliary windings 14, 15 and 16 may be designed so as to normally generate a voltage twice as great as that required by the auxiliary motors on the line 21, 22 and 23. This generated voltage may be graphically indicated by the lines 31, 32 and 33 of Figure 2. Assuming this voltage to be for example 4800 volts, then the same is bucked down by the windings 17, 18 and 19 by the amounts illustrated at 34, 35 and 36 of Figure 2 or 2400 volts. The voltage across the auxiliary circuit 21, 22 and 23 is therefore 2400 volts, so that with full load on the auxiliary windings, one half the total energy supplied by these windings is turned into the main load circuit through the bucking transformer bank and the other half is fed to the auxiliary circuit. Should the generator be wound with seven coils per pole per phase and the mid coil of each phase used as one of the auxiliary windings then each auxiliary winding will deliver substantially 14% of the generator capacity of which 7% will be turned into the main circuit and the remaining 7% supplied to the auxiliaries.

Under such assumptions, the reactance voltage drop of the main machine windings as well as that of the reactors 5, 6 and 7 may be made to equal 15% of the terminal voltage of the normal main machine winding at full load so that the total reactance drop to the main bus 10, 11, 12 is 30%. With the main windings capable of feeding 1.3 times normal current into a three phase short circuit on the main bus, then in case of such a short circuit the internal generated voltage of the main windings will be approximately 1.8×30% = 54% of normal and the terminal voltage will be 27% of normal. Since the auxiliary windings have generated in them a voltage approximately equal in percent to that generated in the main windings, then the voltage so generated is 54% of 4800 volts or 2592 volts. Owing to the short circuit there is no voltage on the primaries 26, 27 and 28 and hence there is very little loss of voltage in secondaries 17, 18 and 19, with the result that the voltage on the auxiliary circuit 21, 22 and 23 is 2592 less the impedance drop in the generator and transformer windings. Thus the voltage impressed upon the auxiliary circuits is substantially 2400 volts regardless of conditions in the main load circuit which is highly desirable in power plants where continuous and reliable service is essential.

Figure 3:
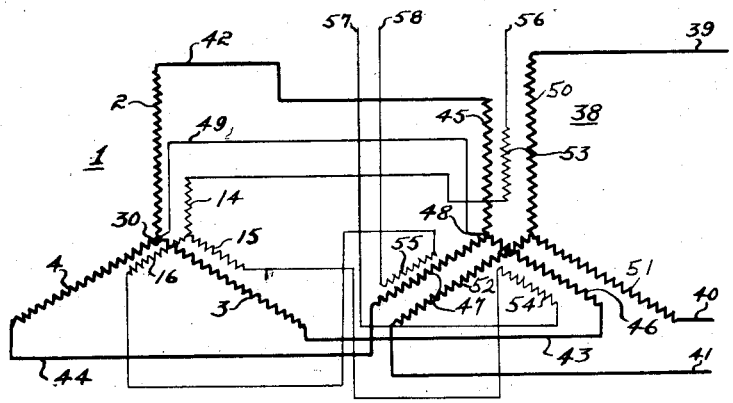
Figure 3 is a diagrammatic representation of a slightly modified arrangement of generating system.

In Figure 3 the generator 1 is shown connected through a three phase transformer bank 38 to a transmission line 39, 40 and 41. The main windings 2, 3 and 4 of the generator are connected by leads 42, 43 and 44 to the primaries 45, 46 and 47 of the transformer bank 38. The neutral point 48 of the primaries 45, 46 and 47 may be connected as by a lead 49 to the neutral 30 of the main generator windings. The secondaries 50, 51 and 52 of the transformer 38 are connected directly to the transmission line 39, 40 and 41. The auxiliary windings 14, 15 and 16 of the generator 1 are connected to corresponding ends of tertiary windings 53, 54 and 55 respectively incorporated in the transformer bank 38. Tertiary windings 53, 54 and 55 act to normally buck the voltage of the auxiliary generator windings down to the value desired to be impressed upon the auxiliary circuit 56, 57 and 58 that is connected to the other ends of these tertiary windings. This auxiliary circuit corresponds to auxiliary circuit 21, 22 and 23 of Figure 1 and is used to supply electrical energy to the auxiliaries of generator 1. In the event of a short circuit on the transmission line 39, 40 and 41 the voltage on the primary and secondary windings of the transformer bank 38 will decrease and the ability of the tertiary windings to buck down the voltage of the auxiliary windings 14, 15 and 16 will correspondingly decrease so that the voltage impressed upon the auxiliary circuit 56, 57 and 58 may be substantially the same as existed prior to the short circuit condition, provided the characteristics of the transformer bank are of the proper values to secure this result. For example, if the transformer bank 38 is designed to have an impedance of 16% and if this impedance is divided approximately equally between the primary and tertiary windings and the tertiary and secondary windings, then the total impedance in the circuit including that of the main generator windings is 16 plus 15 or 31% and if the generator can supply 1.78 of fullload current through this impedance during short circuit of the transmission line then the internal voltage will be 1.78×31% or approximately 55%. The bucking voltage across tertiary windings 53, 54 and 55 will equal 1.78×8% = 14% of full load voltage approximately. As the voltage generated in the auxiliary windings 14, 15 and 16 is $$4800 \times .55 = 2640 \text{ volts}$$

approximately and the amount of buck in the transformer windings is 2400×.14 or 340 volts then the auxiliary motors will receive 2640−340=2300 volts approximately, which is substantially the same as the 2400 volts which was impressed on the line prior to the short circuit.

In the arrangement illustrated in Figure 3, the reactors 5, 6 and 7 are unnecessary inasmuch as the reactance of the transformer bank 38 is utilized to limit the short circuit current in the main windings.

Figures 2, 4:
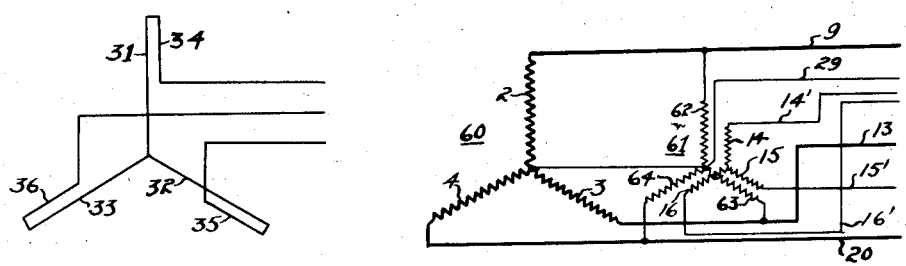
Figure 2 is a diagrammatic illustration of the operation of a portion of the novel power generating system of Figure 1.
Figure 4 is a view similar to Figure 1 but illustrates a standard three phase generator utilized as the energy source.

It is obvious that this invention may be applied if desired to present standard generators of the type having but one winding connected to a bus through reactors. In this case two transformer banks may be used, the first having its primaries connected between the generator and the reactors and the second having its primaries connected between the reactors and the bus. The secondaries of the second bank would be wound to have a lower voltage than the secondaries of the first bank and would be connected to buck down the voltage of the first bank. The auxiliary motors would therefore receive a voltage equal approximately to the difference in the induced voltage of the first and second transformer banks. Such an arrangement is illustrated in Figure 4 wherein the generator 60 is adapted to supply current to leads 9, 13 and 20 as in Figure 1. The auxiliary generator windings are omitted however, and a transformer 61 has primaries 62, 63 and 64 connected to leads 9, 13 and 20, which transformer is adapted to energize the auxiliary windings 14, 15 and 16. The remainder of the diagram Figure 4 is omitted as the structure involved is identical with the corresponding portion of Figure 1, to the right of line a—a in said Fig. 1.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In combination, a source of electrical energy, a main power circuit having an impedance in series relation with said source, an additional impedance connected through said series impedance to said source, an auxiliary power circuit connected to receive energy from said source, and means inductively connected to said additional impedance, said means acting to buck down the voltage of said auxiliary power circuit.

2. In an electric generating system, a power circuit, an auxiliary power circuit, transformer means associated with said power circuits, and a generator having a main winding and an auxiliary winding, said main winding being adapted to supply electrical energy to said first named circuit and said auxiliary winding being adapted to supply energy to said transformer means, said transformer means acting to furnish a part of the energy so received to said first named circuit and the remainder to said auxiliary power circuit in such proportions, that regardless of voltage variations in said first named power circuit, the voltage of said auxiliary circuit remains substantially constant.

3. In an electric generating system, a power circuit, an auxiliary power circuit, bucking transformer means associated with said power circuits, and a generator having a main winding and an independent auxiliary winding, said main winding being adapted to supply electrical energy to said first named circuit and said auxiliary winding being adapted to supply energy through said bucking transformer means to said auxiliary power circuit, said transformer means acting to maintain a substantially constant voltage upon said auxiliary circuit by variations in its bucking action that are substantially proportional to voltage changes in said first named circuit.

4. In an electric generating system, a power circuit, an auxiliary power circuit, transformer means cooperating with said power circuits, and a generator having a main winding and an auxiliary winding, said main winding being adapted to feed its generated energy to said first named circuit and said auxiliary winding being adapted to feed its generated energy to said auxiliary power circuit, said transformer means being adapted to feed a portion of the energy generated in said auxiliary winding into said first named circuit, the amount of power so fed by said transformer means being substantially proportional to the excess voltage generated in said auxiliary winding over that required by said auxiliary power circuit.

5. In an electric generating system, a main power circuit, an auxiliary power circuit, reactive means in series with said main power circuit, a generator having a main winding and an auxiliary winding, said main winding being adapted to feed its generated energy through said reactive means into said main power circuit, a bucking transformer adapted to be excited by current from said main winding with said reactive means intervening, and said auxiliary winding being adapted to feed said auxiliary circuit, said reactive means cooperating with said bucking transformer to maintain a substantially constant voltage on said auxiliary circuit under varying load conditions on said main circuit.

6. In a generating system, a generator having two windings, one of said windings being adapted to supply electrical energy to a load, an auxiliary power circuit supplied with electric energy from the other of said windings, and a bucking transformer excited by energy from said first named winding and acting to reduce the voltage supplied to said auxiliary power circuit.

7. In a generating system, a power circuit, an auxiliary circuit and transformer means connected to said power circuit and to said auxiliary circuit, said transformer means acting to buck down the voltage of said auxiliary circuit at times of light load on said power circuit, both said power circuit and said transformer means being subject to concurrent and substantially equal voltage changes.

8. In combination, a source of electrical energy, a main load circuit connected to said source, impedances included in said main load circuit and connected in series relation with said source, an auxiliary power circuit connected to receive energy from said source, and transformer means having primary windings connected to said power source through said impedances and secondary windings connected in said auxiliary power circuit to buck down the voltage thereof.

9. In combination, a power circuit having a portion thereof subject to some variation in voltage with given variations in load and a second portion thereof subject to relatively great variations in voltage with said given variations in load, and an auxiliary power circuit coupled to said first named portion of said power circuit to receive electric energy therefrom, said auxiliary power circuit being coupled to the second named portion of said power circuit to deliver a portion of its received energy thereto, such delivered energy being proportional to the voltage of the second named portion of said power circuit at the point of coupling of said auxiliary power circuit thereto.

10. In a generating system, a power source, said power source being subject to some change in voltage with given variations in load thereon, a load circuit connected to said power source, said load circuit being subject to relatively great changes in voltage with said given variations in load, an auxiliary power circuit connected to said power source, and transformer means connected to said load circuit and to said auxiliary power circuit, said transformer means applying a variable voltage in said auxiliary power circuit acting in opposition to the voltage thereof, said variable voltage being proportional to the voltage on said load circuit and having actual variations that are substantially equal to and concurrent with the actual voltage variations of said power source.

In testimony that I claim the invention set forth above I have hereunto set my hand this 29th day of August, 1928.

FRAZER W. GAY.